(12) United States Patent
Murray

(10) Patent No.: US 7,950,844 B2
(45) Date of Patent: May 31, 2011

(54) COOK POT STIRRER

(76) Inventor: Sean T. Murray, Fairfax, VA (US)

( * ) Notice: Subject to any disclaimer, the term of this patent is extended or adjusted under 35 U.S.C. 154(b) by 0 days.

(21) Appl. No.: 12/662,496

(22) Filed: Apr. 20, 2010

(65) Prior Publication Data

US 2011/0011275 A1  Jan. 20, 2011

Related U.S. Application Data

(60) Provisional application No. 61/213,783, filed on Jul. 15, 2009.

(51) Int. Cl.
*B01F 7/20* (2006.01)
*A47J 43/044* (2006.01)

(52) U.S. Cl. .................. 366/251; 366/282; 99/348

(58) Field of Classification Search .......... 366/241–251, 366/281–284, 286; 99/348
See application file for complete search history.

(56) References Cited

U.S. PATENT DOCUMENTS

| | | | |
|---|---|---|---|
| 3,357,685 A | | 12/1967 | Stephens |
| 3,783,770 A | | 1/1974 | Aries |
| 4,151,792 A | | 5/1979 | Nearhood |
| 4,959,517 A | * | 9/1990 | Jump et al. .................. 219/726 |
| 5,013,158 A | | 5/1991 | Tarlow |
| 5,201,263 A | | 4/1993 | Teng |
| D341,291 S | | 11/1993 | Dow, III |
| 5,271,673 A | * | 12/1993 | Bohnet et al. .................. 366/245 |
| 5,372,422 A | | 12/1994 | Dubroy |
| 5,516,208 A | | 5/1996 | Givant |
| 5,547,279 A | | 8/1996 | Spitzer Sr. |
| 5,676,464 A | * | 10/1997 | Mattar .................. 366/282 |
| 5,711,602 A | * | 1/1998 | Rohring et al. .................. 366/251 |
| 5,765,947 A | * | 6/1998 | Dubroy .................. 366/249 |
| 5,816,136 A | * | 10/1998 | Stallings .................. 99/335 |
| 5,829,344 A | * | 11/1998 | Lande .................. 99/453 |
| 6,089,143 A | * | 7/2000 | Figueroa .................. 99/327 |
| 6,113,258 A | * | 9/2000 | Ardent .................. 366/282 |
| 6,286,990 B1 | | 9/2001 | De Zuazo Torres |
| 2011/0011275 A1 | * | 1/2011 | Murray .................. 99/348 |

FOREIGN PATENT DOCUMENTS

WO  82/04385  * 12/1982

OTHER PUBLICATIONS

StirChef-Saucepan Stirrer, Amazon.com, http://www.amazon.com/StirChef-Saucepan-Stirrer/dp/B0000TPBYG, 1 paged printed from the Internet on Apr. 12, 2009.

* cited by examiner

*Primary Examiner* — Charles E Cooley
(74) *Attorney, Agent, or Firm* — Richard C. Litman

(57) ABSTRACT

The cook pot stirrer is a stirring mechanism incorporated into a lid that covers a cooking vessel. The cook pot stirrer is adapted for stirring liquid content of the cook pot. The mechanism includes a battery power source connected to a motor having reduction gearing connected to a removably attachable stirring tool. A speed control adjusts motor speed, thereby regulating the speed of the stirring device. A protective dome covers the stirring mechanism to isolate the motor and electronics from the contents of the pot. The protective dome is removable for maintenance and battery replacement. Stirring tools of various lengths, heights and surface areas may be provided for use in a variety of cooking situations.

4 Claims, 5 Drawing Sheets

COOK POT STIRRER

CROSS-REFERENCE TO RELATED APPLICATION

This application claims the benefit of U.S. Provisional Patent Application Ser. No. 61/213,783, filed Jul. 15, 2009.

BACKGROUND OF THE INVENTION

1. Field of the Invention

The present invention relates generally to cookware and kitchen appliances and particularly, to a cook pot stirrer integral with a lid covering a cooking pot.

2. Description of the Related Art

In the preparation of puddings, sauces, gravies, etc., the ingredients are usually placed in a sauce pan or other utensil and cooked for the required time, generally from six to ten minutes for thickening, during which period they must be constantly stirred to avoid scorching, and they must also be checked frequently to prevent boiling over. All of this is time consuming and tedious for the cook, and unless extreme care is taken, the results are unsatisfactory.

Thus, a cook pot stirrer solving the aforementioned problems is desired.

SUMMARY OF THE INVENTION

The cook pot stirrer is a stirring mechanism incorporated into a lid that covers a cooking vessel. The cook pot stirrer is adapted for stirring liquid content of the cook pot. The mechanism includes a battery power source connected to a motor having reduction gearing connected to a stirring tool. A speed control adjusts motor speed, thereby regulating the speed of the stirring device. A protective metal dome covers the stirring mechanism to isolate the motor and electronics from the contents of the pot. The protective metal dome is removable for maintenance and battery replacement. Stirring tools of various lengths, heights and surface areas may be provided as attachments to the cook pot stirrer.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
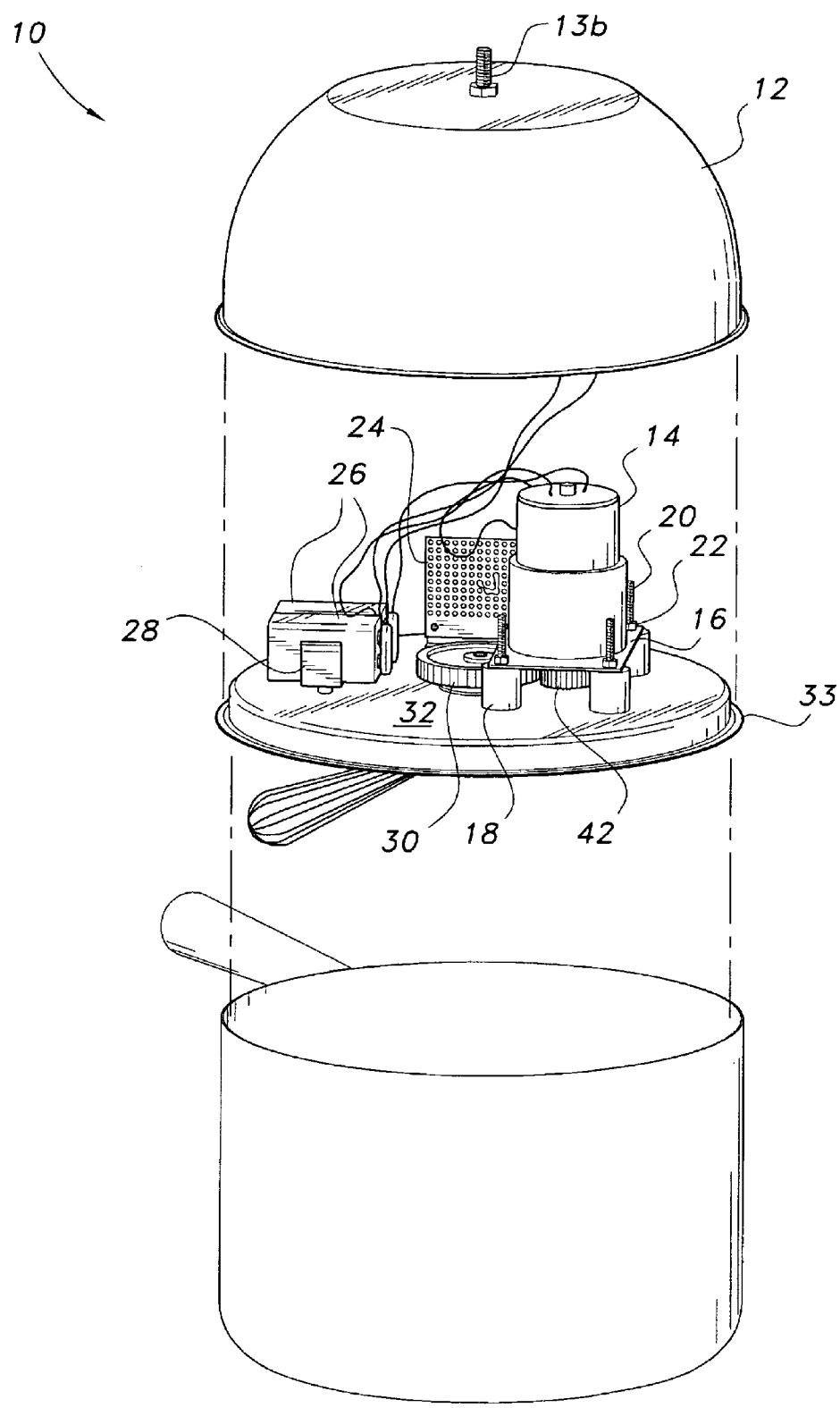
FIG. 1 is an environmental, perspective view of a cook pot stirrer according to the present invention.
Figure 2:
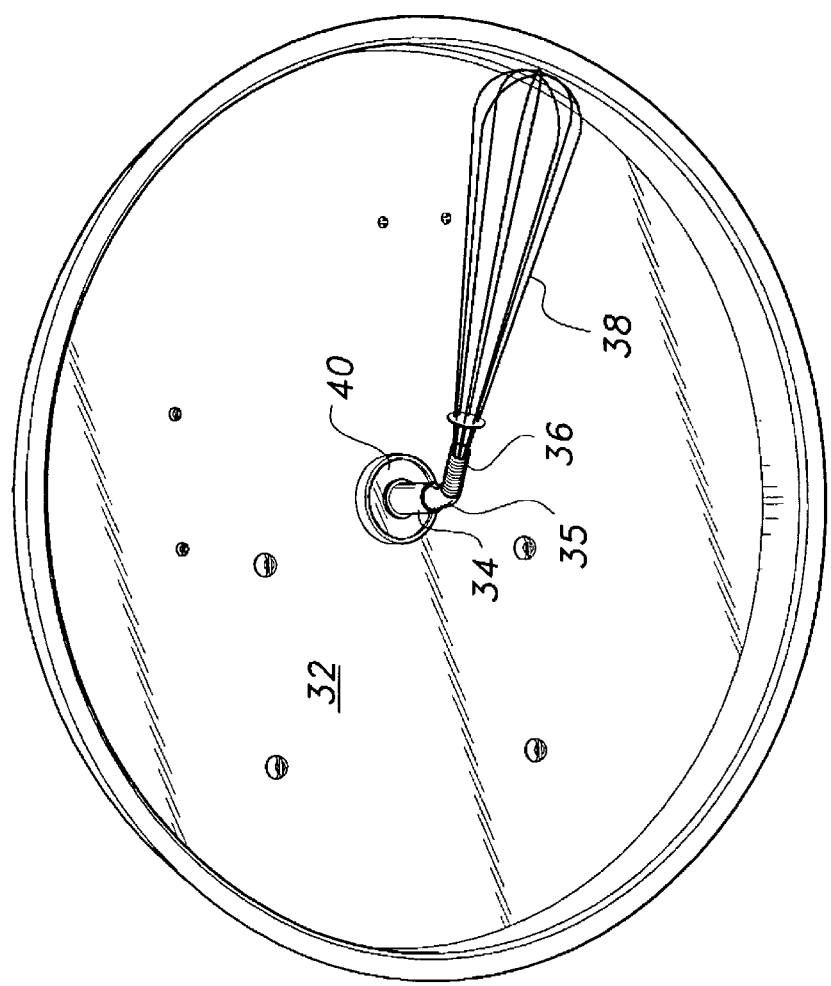
FIG. 2 is a bottom perspective view of a cook pot stirrer according to the present invention.
Figure 3:
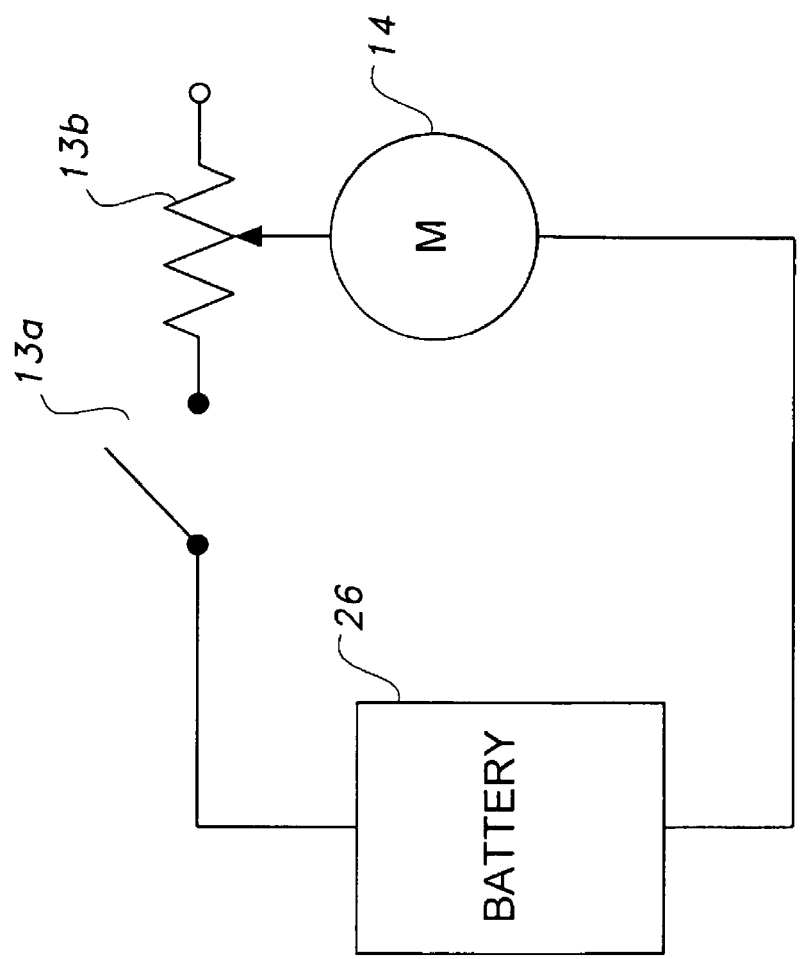
FIG. 3 is an electrical schematic diagram of a first embodiment of a circuit for a cook pot stirrer according to the present invention.

As shown in FIGS. 1-3, the cook pot stirrer 10 has a stirring mechanism attached to a base 32 that covers a cooking pot. The base 32 is circular and has a radially extending flange 33 that stabilizes the stirrer 10 when placed on top of a cooking pot. Moreover, the protective metal base 32 covers the stirring mechanism to isolate the motor and electronics from the contents of the pot. A substantially dome shaped housing 12 having a flat planar circular top removably attaches to the base 32 and also provides protection to the stirring mechanism by preventing the introduction of cooking fluids, and the like, into the unit 10. The housing 12 is removable for maintenance and battery replacement of the unit 10.

A combination power switch 13a and potentiometer 13b attaches to and extends upward from the top of domed housing 12 for easy access to the user. The potentiometer 13b provides speed adjustment of the stirrer 10.

Figure 4:
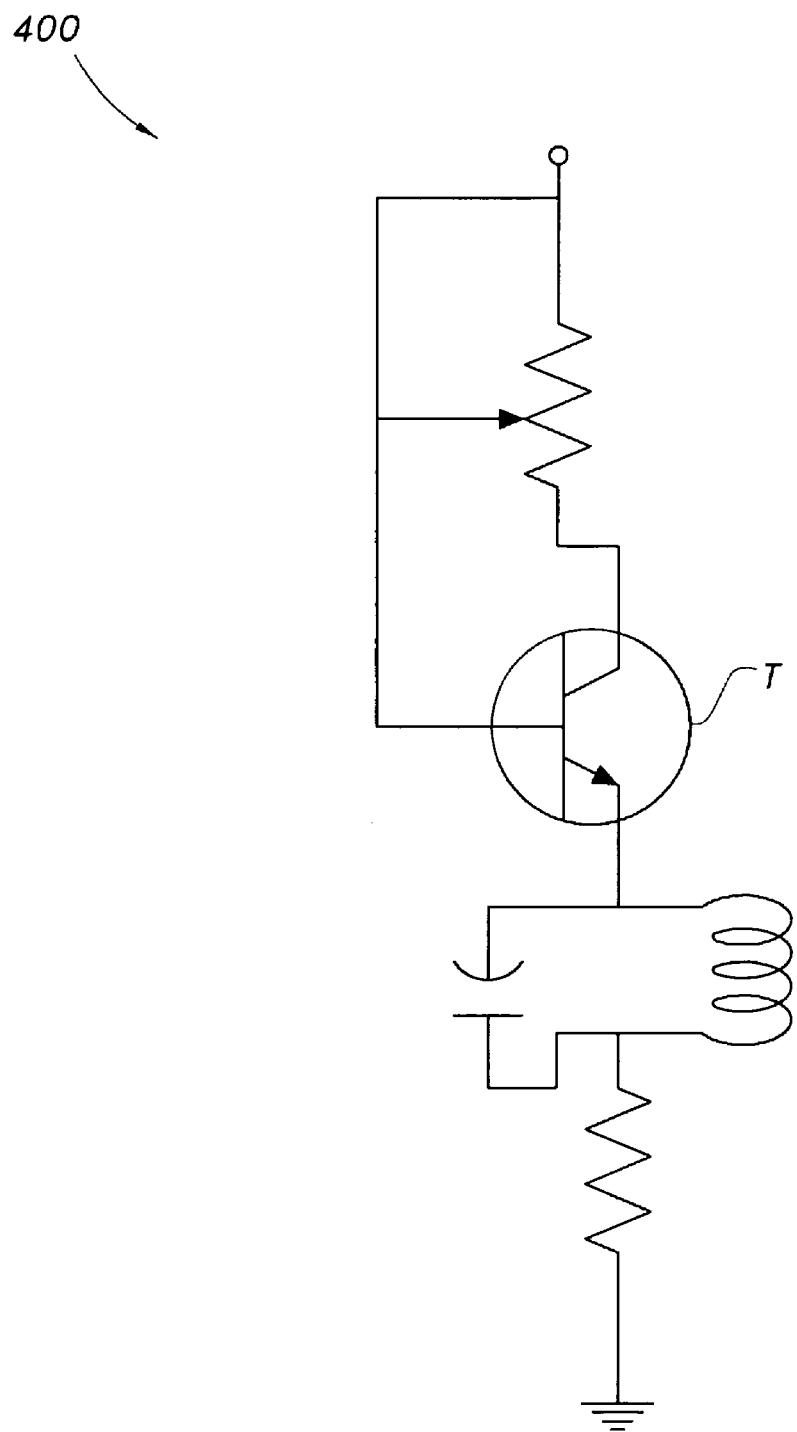
FIG. 4 is an electrical schematic diagram of a second embodiment of a circuit for a cook pot stirrer according to the present invention.
Figure 5:
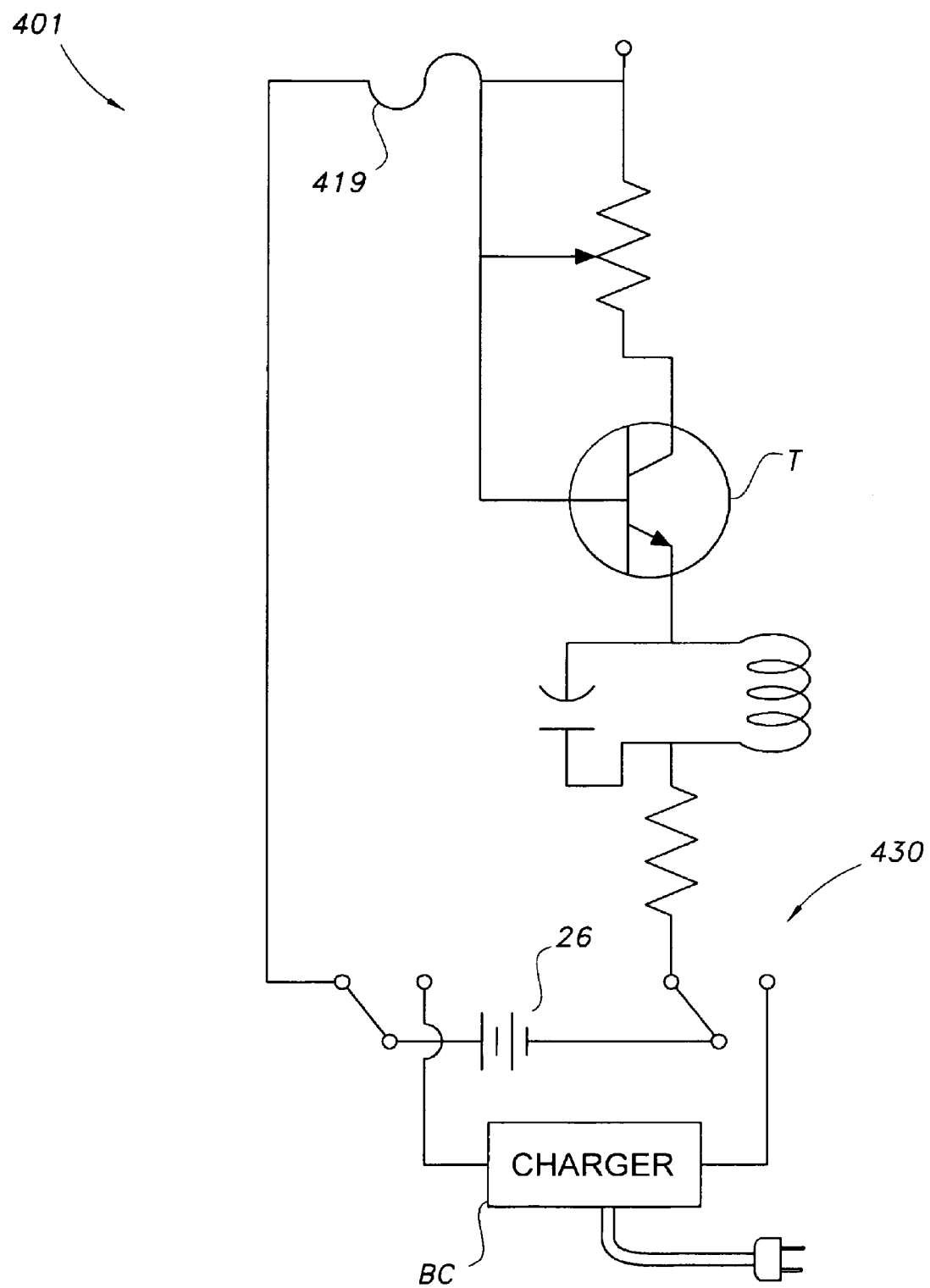
FIG. 5 shows the circuit of FIG. 4 modified 401 with the addition of a fuse 410, DPDT switch 430 and battery charger BC for the cook pot stirrer according to the present invention.

Two nine-volt batteries 26 are electrically connected to a motor 14 via power switch 13a and potentiometer 13b. A circuit board 24 mounted on the base 32 facilitates the electrical connection of motor 14, controls 13a, 13b, and power source 26. FIG. 3 most clearly shows the electrical connection of batteries 26 to switch 13a, potentiometer 13b and motor 14. The batteries 26 are held in place via battery attachment bracket 28, which is connected to and extends from the base 32. FIG. 4 shows an alternative circuit 400 that utilizes a transistor T. FIG. 5 shows cook pot stirrer energizing circuitry 401 having the addition of a fuse 419, a double pole-double throw (DPDT) switch 430, and battery charger BC for the cook pot stirrer 10. The switch 430 switches batteries 26 between the cook pot stirrer motor energizing circuitry 401 and a battery charger BC.

As shown in FIG. 1, motor 14 is attached to motor mounting plate 16. The motor mounting plate 16 is attached to the base 32 atop bushings 18 and held in place by threaded bolts 20 and nuts 22. The motor 14 has a pinion gear 42 in contact alignment with reduction drive gear 30, which is rotatably mounted on the base 32 through center bearing 40 and attached to drive shaft 34 which extends below the base 32. As most clearly shown in FIG. 2, a substantially cylindrical, hollow tool adapter 35 is connected to and extends from drive shaft 34. The tool adapter 35 accepts a variety of stirring utensils such as e.g., beating utensil 38. All such utensils have a spring connector 36 that inserts into the tool adapter 35. The spring connector 36 allows for resilient and or gyrating stirring action when the unit 10 is in operation.

It is contemplated that the stirring tools may be of a variety of lengths, heights and surface areas to address most cook pot stirring needs.

It is to be understood that the present invention is not limited to the embodiment described above, but encompasses any and all embodiments within the scope of the following claims.

I claim:

1. A cook pot stirrer, comprising:
    a circular base having a flange extending therefrom and having a bottom, the base being dimensioned and configured for covering a cooking pot;
    a substantially dome-shaped housing removably attachable to the base;
    an on-off switch and a speed control disposed on the housing;
    a battery-operated motor attached to the base, the motor including a pinion gear;
    a battery removably attached to the base, the battery being electrically connected to the motor through the on-off switch and the speed control;
    a drive gear assembly rotatably mounted on the base, the drive gear being in mechanical alignment with the pinion gear of the motor;

a drive shaft extending from the drive gear through the bottom of the base;

a hollow tool adapter connected to and extending from the drive shaft;

a spring connector;

an elongate member having a free end; and a stirring utensil disposed on the elongate member, the spring connector being disposed on the free end, the spring connector being removably insertable into the tool adapter.

2. The cook pot stirrer according to claim 1, wherein the dome-shaped housing has a flat, planar, circular top portion, the speed control extending upward therefrom.

3. The cook pot stirrer according to claim 1, further comprising a fuse disposed in electrical communication between said battery and said motor.

4. The cook pot stirrer according to claim 1, further comprising:

a double pole-double throw (DPDT) switch; and a battery charger, the DPDT switch alternately electrically connecting said battery to energize said motor and connecting said battery to said battery charger.

* * * * *